(12) United States Patent
Cheng (10) Patent No.: US 6,588,848 B2
(45) Date of Patent: Jul. 8, 2003

(54) MOVABLE BAGGAGE RESTRAINT SEAT

(75) Inventor: Chung-Hsiung Cheng, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 53 days.

(21) Appl. No.: 09/859,467

(22) Filed: May 18, 2001

(65) Prior Publication Data

US 2002/0175554 A1 Nov. 28, 2002

(51) Int. Cl.[7] .............................................. A47C 31/00
(52) U.S. Cl. ................. 297/463.1; 297/463.2; 297/423.26; 297/423.3
(58) Field of Search ............... 297/188.01, 188.08, 297/423.26, 423.3, 463.1, 463.2

(56) References Cited

U.S. PATENT DOCUMENTS 2,306,864 A * 12/1942 Caesar et al. .......... 297/423.26
2,335,234 A * 11/1943 Caesar et al. ....... 297/423.26 X

* cited by examiner

Primary Examiner—Anthony D. Barfield
(74) Attorney, Agent, or Firm—Troxell Law Office PLLC (57) ABSTRACT

A moveable baggage restraint seat, is composed of a row of seat, two side restraint rods and a major restraint rod. An article accommodation space under above-said seat can accommodate baggage inside it and two sides of the seat each also arranges with a pivotal axis. The above-said two side restraint rods each has a first end and a second end, wherein the first end is pivotally connected to the pivotal axis of two sides of the seat and each second end is connected to two ends of the major restraint rod. Because the two side restraint rods are pivotally connected to two sides of the seat and connected with two ends of the major restraint rod to form a movable baggage restraint rod, when the baggage restraint rod is rotated under the seat, the baggage restraint rod may restrict the baggage under the seat. When the baggage restraint rod is rotated above the seat, the baggage can be taken out and it is more convenient to clean the floor under the seat.

7 Claims, 7 Drawing Sheets

MOVABLE BAGGAGE RESTRAINT SEAT

BACKGROUND OF THE INVENTION

1. Field of the Invention

The present invention relates to a movable baggage restraint seat, especially to a baggage restraint applied under the seat. The baggage restraint is designed as a movable type, which will facilitate passenger to take out (or put in) baggage and worker to clean the floor under the seat.

2. Background of the Invention

For general transportation vehicles of long trip (such as: airplane, steamship, long trip bus and train), in accordance with the need to place baggage for the passenger in long trip, there is always an appropriate accommodation space available under the passenger seat to place personal baggage.

Figure 1A:
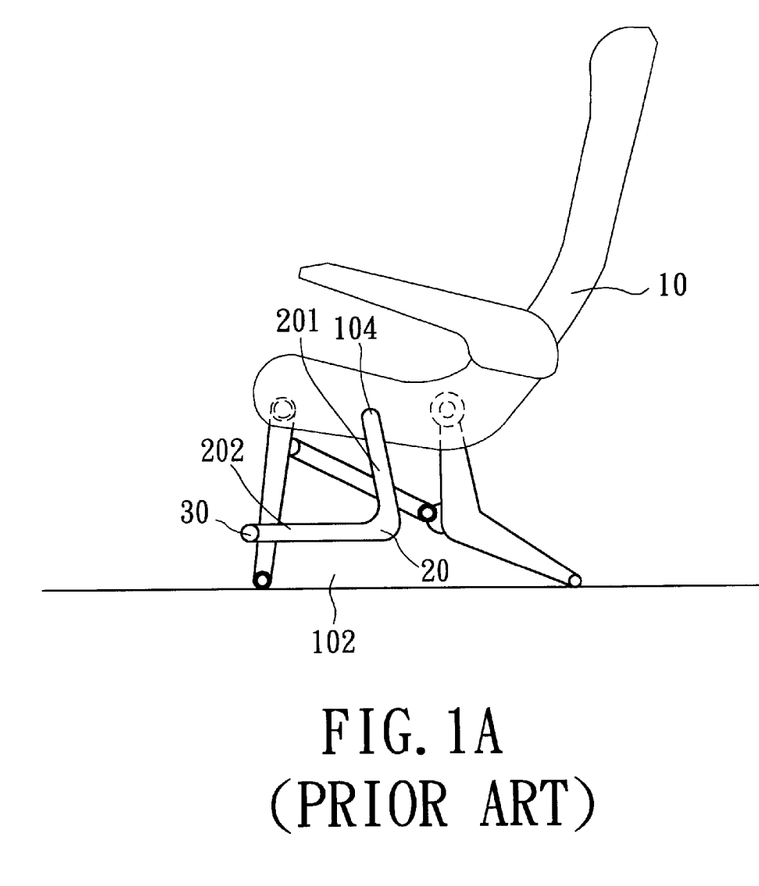
FIGS. 1(A), 1(B) are illustrations for the baggage restraint rod seat of the prior art.
Figure 1B:
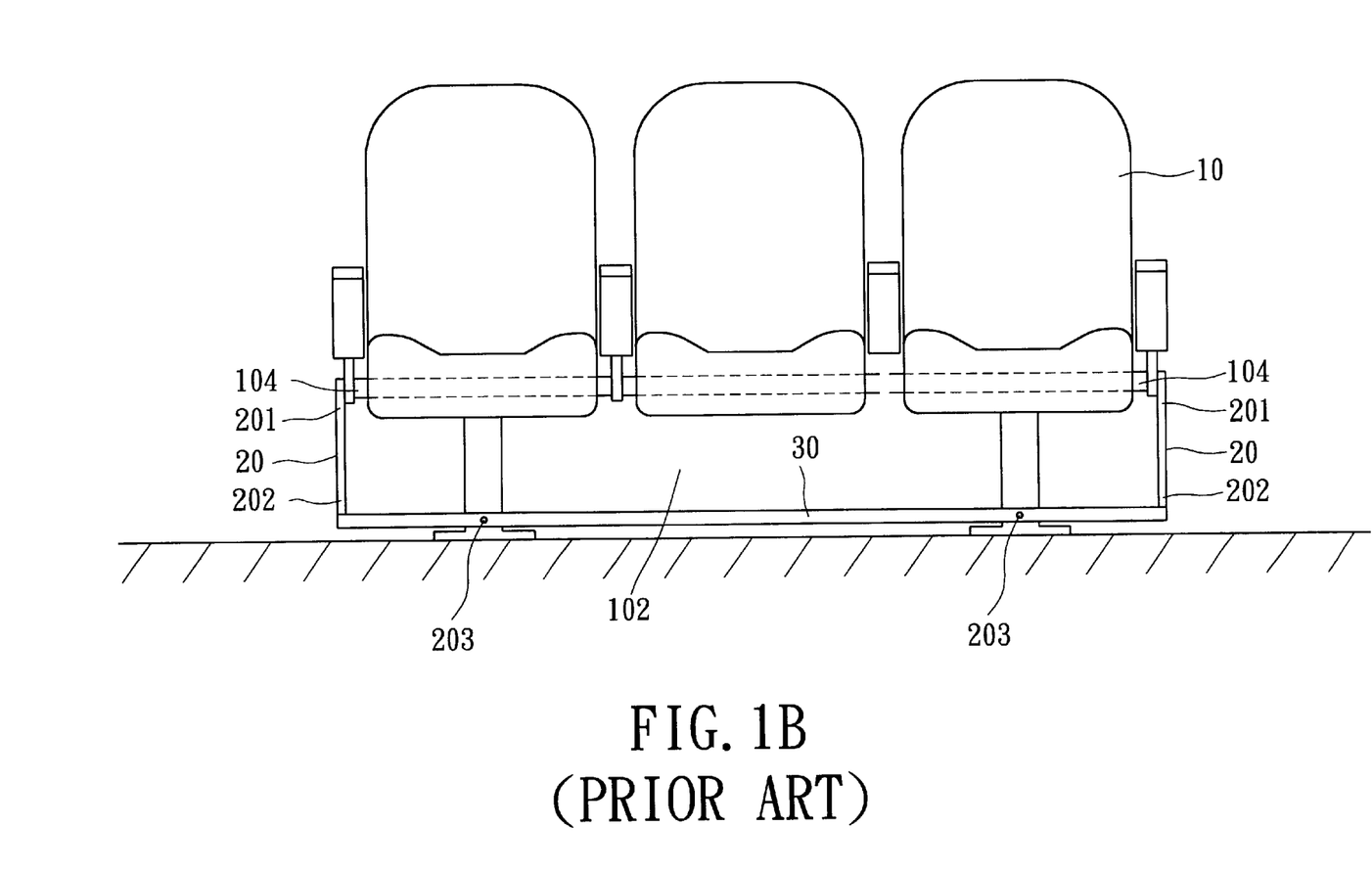

Please refer to FIG. 1(A) and FIG. 1(B), which show the baggage restraint seat of prior art, and which include a row of seat 10, two side restraint rods 20 and a major restraint rod 30. Taking airplane for example, the seat 10 is usually a row of three seats, wherein an article accommodation space 102 is provided under the seat for the passenger to place his personal baggage (not shown in the diagrams) inside it, and two sides of the seat row each has a connection part 104. Above-said two side restraint rods 20 each has a first end 201 and a second end 202, and the first end of above-said two side restraint rods 20 is fixedly connected to the connection part 104 of the two sides of the seat 10. The major restraint rod 30 is arranged horizontally at appropriate position near the lower end of the Fore-Leg of the seat 10 and its two ends each is connected to the second end 202 of above-said two side restraint rod 20. In general, the latitude of the rod bottom of the major restraint rod 30 is restricted within a distance of 2.5 inch from the floor and its rod top is over a distance of 3.0 inch from the floor. Therefore, if the baggage restraint rod is fixed and unable to move, it will hinder workers from cleaning the floor under the seat and also hinder passenger from placing in and taking out his baggage under the seat.

After the passenger being seated on the seat 10, he can place his personal baggage inside the article accommodation space 102 that is under the seat 10. The baggage is restricted inside the space formed by two side restraint rods 20 and the major restraint rod 30 to avoid moving caused by the shake of the airplane body during the fight course of the airplane. However, because the baggage restraint rod of the prior art (includes the major rod 30 and two side restraint rods 20) are not designed as movable but fixed to the fore-leg of the seat 10, when the passenger is going to place his baggage under the seat 10, placing baggage will become very difficult due to the hindrance of the major restraint rod 30. Similarly, taking out the baggage also becomes difficult due to the hindrance of the major restraint rod 30 and two side restraint rods 20. Furthermore, when the clean worker wants to clean the floor under the seat 10, because the major restraint rod 30 together with two side restraint rods 20 are fixed under the seat 10, it will always become very difficult to clean the floor that is under the seat 10 and increase the time of cleaning. Especially for the international airline, the stop time for the airplane is quite limited, if the cleaning time is prolonged, it could delay the time for airplane's routine checking and maintaining procedures. Therefore, if the shortcoming of the prior art caused by the baggage restraint rod being fixed under the seat 10 is improved, then it will facilitate the passenger to place in and take out his baggage and make it more easy to clean the floor under the seat 10 and greatly promote the service quality of airplane travel (or other long trip transportation vehicles).

SUMMARY OF THE INVENTION

The major object of the present invention is to provide a movable baggage restraint seat. The baggage restraint rod of the seat is designed as a movable restraint rod. When the passenger is placing in or taking out his baggage, the baggage restraint rod arranged under the seat can be lifted up above the seat to facilitate the operation for the passenger. Furthermore, when the clean worker is cleaning the floor under the seat, because the movable baggage restraint rod can be lifted up, it will increase the operation time efficiency for cleaning the floor and promote the service quality of airplane travel (or other long trip transportation vehicles).

The present invention provides a moveable baggage restraint seat, which is composed of a row of seat, two side restraint rods and a major restraint rod. An article accommodation space under above-said seat can accommodate baggage inside it and two sides of the seat each also arranges with a pivotal axis. The above-said two side restraint rods each has a first end and a second end, wherein the first end is pivotally connected to the pivotal axis on the side of the seat and each second end is connected respectively to one of the two ends of the major restraint rod. Because the two side restraint rods are pivotally connected to two sides of the seat and connected with two ends of the major restraint rod to form a movable baggage restraint rod, when the baggage restraint rod is rotated under the seat, the baggage restraint rod may restrict the baggage under the seat, when the baggage restraint rod is rotated above the seat, the baggage can be taken out and it is more convenient to clean the floor under the seat.

For your esteemed review committee to further understand and recognize the purposes, characteristics and functions of the present invention, a detailed description together with several diagrams are presented as following:

DETAILED DESCRIPTION OF THE PREFERRED EMBODIMENT

Figure 2A:
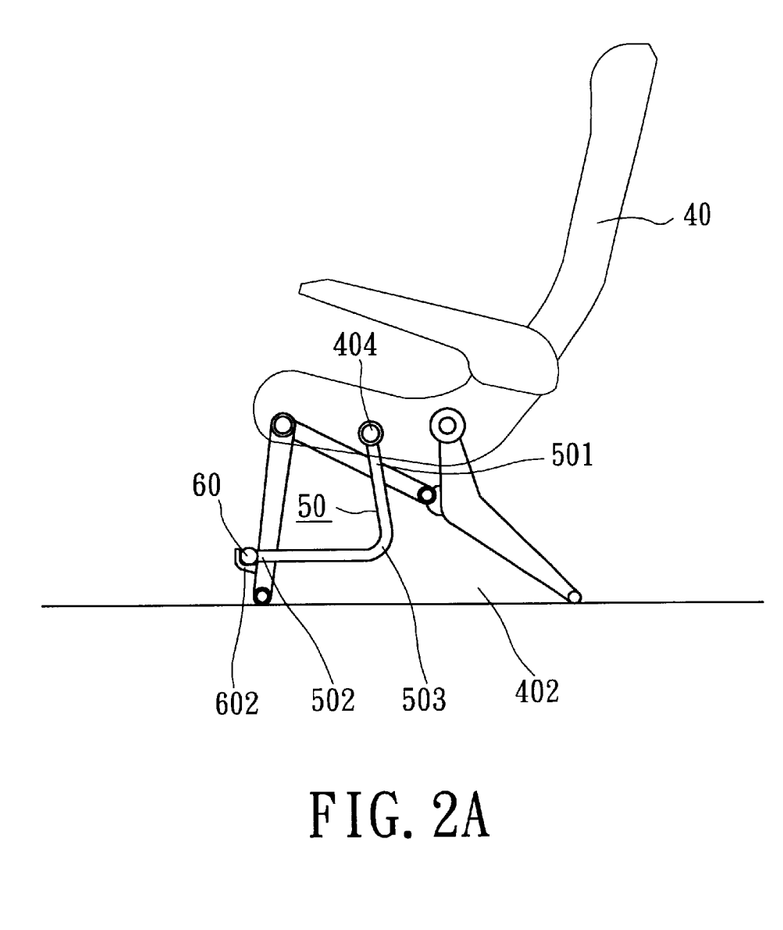
FIGS. 2(A)~2(C) are the first embodiment diagrams for the movable baggage restraint seat of the present invention.
Figure 2B:
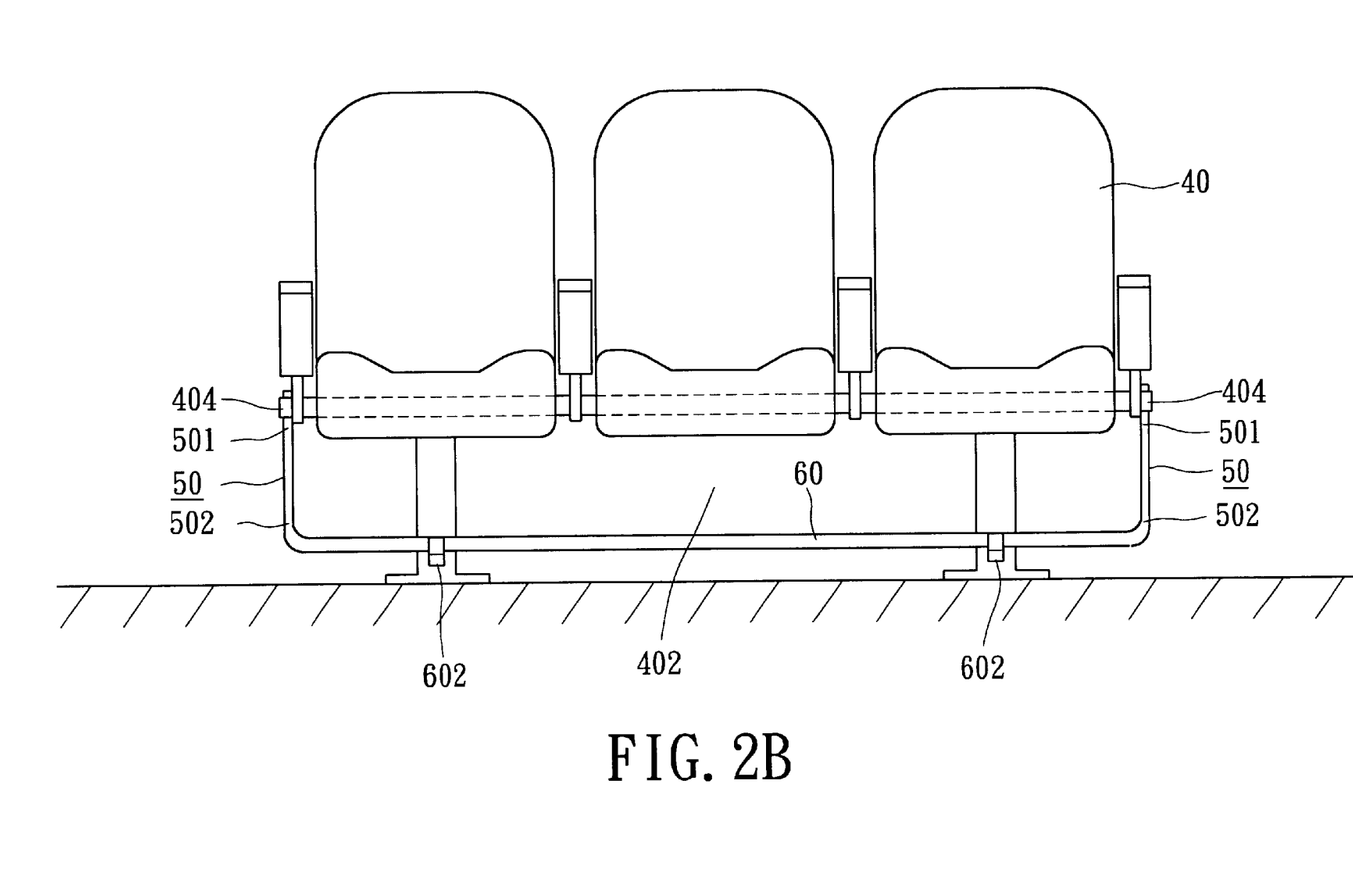
Figure 2C:
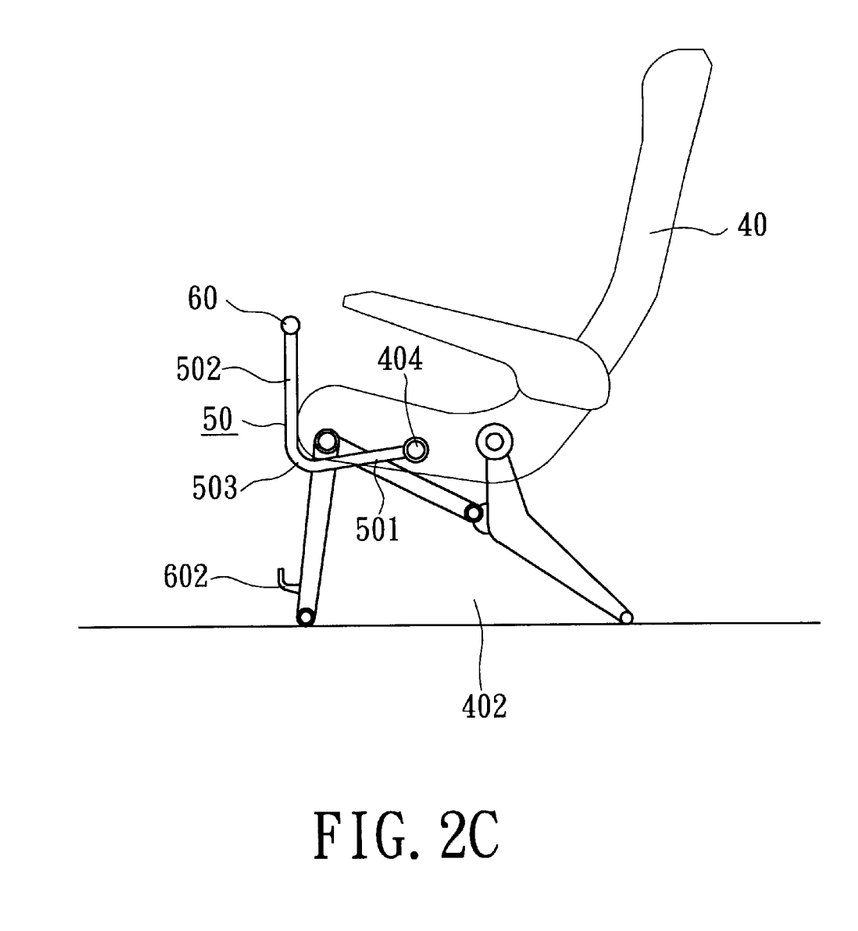

Please refer to FIGS. 2(A), 2(B) and 2(C), which are the first embodiment illustrations of the movable baggage restraint seat of the present invention. The movable baggage restraint seat includes a row seat 40 (composed of three seats 40), two side restraint rods 50 and a major restraint rod 60.

An article accommodation space 402 is arranged under the above-said seat 40 to accommodate baggage inside it and two sides of the seat 40 each also arranges with a pivotal axis 404. The above-said two side restraint rods 50 are made in a shape of "L". The side restraint rod 50 each has a first end 501 and a second end 502. Between the two ends is a formation of elbow 503. The first end 501 is pivotally connected to the pivotal axis arranged at two sides of the seat 40. The second end 502 each is connected respectively to one of the two ends of the major restraint rod 60. The elbow part 503 is formed under the seat 40.

Because the two side restraint rods 50 are pivotally connected to two sides of the seat 40 and connected with two ends of the major restraint rod 60 to form a movable baggage restraint rod, by holding two side restraint rods 50, the baggage restraint rod can rotate around the pivotal axis 404 arranged at two sides of the seat 40. When the baggage restraint rod (includes the side restraint rods 50 and the major restraint rod 60) rotates to the position under the seat 40, the major restraint rod 60 is located under the fore-end of the seat 40, while two side restraint rods 50 is located on two sides under the seat 40. This structure will restrict the baggage under the seat 40 to avoid moving of the baggage caused by the shake of the airplane body during flight course of the airplane. Wherein, in order to firm restrict the baggage under the seat 40 by the major restraint rod 60, the baggage restraint rod arranges two connection devices 602 at the fore-leg under the seat 40. When the major restraint rod 60 is rotated to the position under the seat 40, the connection devices 602 can connect the major restraint rod 60 to the fore-leg and restricts the altitude of the rod bottom of the major restraint rod 60 to an appropriate distance from the floor (the current regulation is within 2.5 inch), and the current regulation for the appropriate altitude of the rod top is 3.0 inch above the floor. Please refer to FIG. 2(C). When the passenger wants to rotate the baggage restraint rod to the position above the seat 40, he should firstly separate the major restraint rod 60 from the connection devices 602 and then rotate the major restraint rod 60 to the position above the seat 40. At this time, there is no hindrance of the baggage restraint rod under the seat 40, and it is convenient for the passenger to take out or put in his baggage. When the clean personnel is cleaning the floor under the seat 40, the cleaning efficiency won't be influenced by the hindrance caused by the baggage restraint rod. Further, the pivotal axis 404 of the baggage restraint rod of the present invention, arranged at two sides of the seat 40, can also be changed into a design of a ratchet wheel rotating axis with twisting force spring. The ratchet-wheel-rotating-axis can restrict the rotation of the baggage restraint rod within a specific angle range. The twisting force spring can provide the ratchet-wheel-rotating-axis to activate the baggage restraint rod with twisting force to rotate downward. When the force for lifting up the baggage restraint rod is disappeared, the baggage restraint rod will automatically rotate downward and make the major restraint rod 60 connect to the connection devices 602 which are at the fore-leg.

Figure 3A:
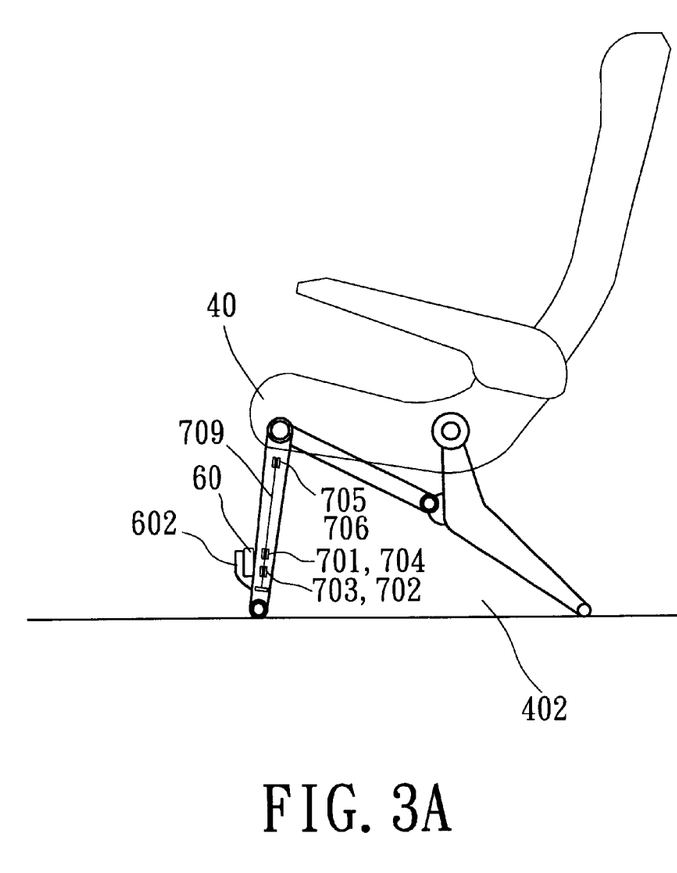
FIGS. 3(A), 3(B) are the second embodiment diagrams for the movable baggage restraint seat of the present invention.
Figure 3B:
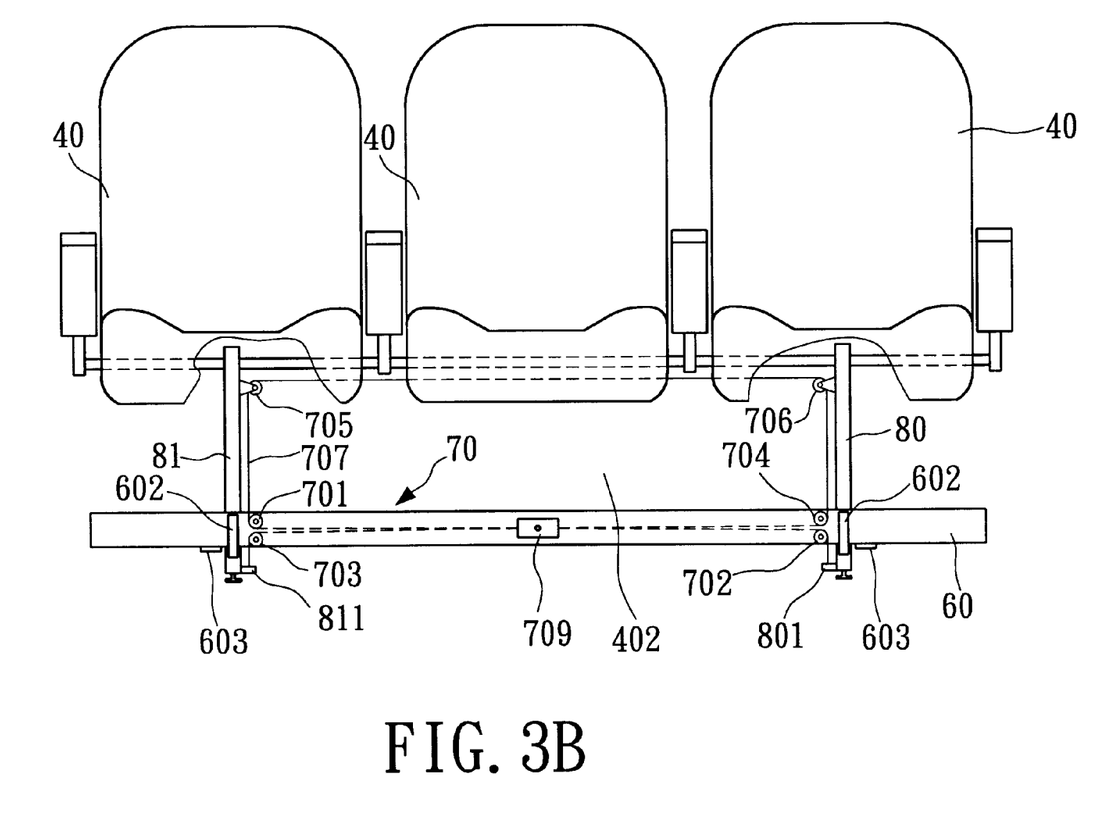

Please refer to FIG. 3(A) and FIG. 3(B), which are the second embodiment illustrations for the movable baggage restraint seat of the present invention. The baggage restraint rod seat includes a row of seats 40 (usually is a row of three seats, but not restrict to three seats), block set 70 and a movable major restraint rod 60.

An article accommodation space is arranged under above-said seat 40 to accommodate baggage inside it. The above-said block set 70 each is arranged under the above-said seat 40. Wherein, each block set 70 is comprised of two fixed blocks 705, 706, four traveling blocks 701~704, and a cable 707. The structure also includes a tightening bundle restrainer 709 and cable end fixing seats 801, 811. Wherein, for above-said two fixed blocks 705, 706, the fixed block 705 is fixed at the inner side of the top end of the left leg 81 of the seat 40 and another block 706 is fixed at the inner side of the top end of the right leg 80. Four traveling blocks 701~704 are fixed individually pair by pair to the two close ends of the major restraint end 60. The cable end fixing seats 801, 811 are individually arranged at the lower end of the fore-leg 80, 81. The first end of the cable 707 is fixed to the fixing seat 811. The second end, as shown in FIG. 3(B), in sequence, goes around the traveling block 703, passes through the bundle restrainer 709, goes around the traveling block 704, the fixed blocks 706, 705 and traveling block 701, passes through the bundle restrainer 709 once again, then goes around the traveling block 702, and finally is fixed at the fixing seat 801. The fixed blocks 705, 706 are attached with the cable locking device. The cable bundle restrainer 709 is arranged on the major restraint rod 60 at the middle position between left traveling block set 701, 703 and right traveling block set 702, 704. Loose the cable locking device on the fixed blocks 705, 706, and the restraint of the bundle restrainer 709, then loose the cable end bundle restraint at any end of the fixing seats 811, 801, pull up the cable to adjust the tightness of the cable, then twist tightly the fixing seat, fix the cable, then adjust horizontal level of the major restraint rod 60 or parallel it to the floor surface. After that, lock the cable again by tighting up the locking devices on the fixed blocks 705, 706. Now, greatly pulling the major restraint rod 60 upward or downward can make it move upward or downward in parallel way, and twisting tightly the bundle restrainer 709 can lock up the block set 70 and make the major restraint rod 60 can not move upward and downward. When the bundle restrainer 709 is twisted loosely again, the major restraint rod 60 can be restored to move upward and downward again. Therefore, the restraint rod 60 of this embodiment has an altitude adjustment function. When the restraint rod 60 is pushed downward to be connected with the connection device 602 of the restraint rod and tightens up the bundle restrainer 609 (as shown in FIG. 3(B)), it can restrain the baggage which is accommodated inside the article accommodation space 402 under the seat 40. When the restraint rod, restrained by the cable, is pushed upward to the top end position of the seat fore-leg 80, 81 and tightens up the bundle restrainer 609, it can fix the restraint rod 60 at a position of higher altitude. At this time, it can facilitate the clean job and the taking-out and putting-in of the baggage. Two side-move-stopping restraint 603 are further installed at lower side ends of the file rod 60 and are located at the positions close to the outer sides of the fore-leg 80, 81. When the restraint rod moves upward and downward, the stopping restraint 603 can prevent the restraint rod 60 from moving aside.

What is claimed is:

1. A movable baggage restraint seat comprising:
   at least one seat, under which is an article accommodation space, two sides of the seat having a pivotal axis;
   two side restraint rods, each having a first end and a second end, wherein said first end is pivotally connected to said pivotal axis; and
   a major restraint rod arranged under said seat, the major restraint rod having two ends, each end is connected to said second ends of said side restraint rods;
   said two side restraint rods being pivotally connected to two sides of said seat and to two ends of said major restraint rod to form a movable baggage restraint whereby, when said baggage restraint is rotated to an under position of said seat, said baggage restraint restrains baggage under said seat, and when said baggage restraint is rotated to an upper position of said seat, it facilitates the taking-out and putting-in of baggage under said seat, wherein said two side restraint rods are formed in an "L" shape, each having an elbow part located at an under position of said seat.

2. The movable baggage restraint seat according to claim 1, wherein said baggage restraint further includes at least one connection device, which is fixed at a fore-leg of said seat, whereby, when said baggage restraint rod is rotated to the under position of said seat, said connection device connects with said major restraint rod to fix said baggage restraint under said seat.

3. The movable baggage restraint seat according to claim 1, wherein said pivotal axis of said seat includes a ratchet wheel rotating axis with spring.

4. The movable baggage restraint seat according to claim 1, wherein said pivotal axis of said seat includes a twisting gear set.

5. A movable baggage restraint seat includes:
- at least one seat, under which is an article accommodation space, two sides of the seat each having a pivotal axis;
- two side restraint rods, each having a first end and a second end, wherein said first end is pivotally connected to said pivotal axis; and
- a major restraint rod arranged under said seat, the major restraint rod having two ends, each end is connected to said second ends of said side restraint rods;
- said two side restraint rods being pivotally connected to two sides of said seat and to two ends of said major restraint rod to form a movable baggage restraint whereby, when said baggage restraint is rotated to an under position of said seat, said baggage restraint rod restrains baggage under said seat, and when said baggage restraint is rotated to an upper position of said seat, it facilitates the taking-out and putting-in of baggage under said seat, wherein said baggage restraint further includes at least one connection device, which is fixed at a fore-leg of said seat, whereby, when said baggage restraint is rotated to the under position of said seat, said connection device connects with said major restraint rod to fix said baggage restraint under said seat.

6. The movable baggage restraint seat according to claim 5, wherein said pivotal axis of said seat includes a ratchet wheel rotating axis with spring.

7. The movable baggage restraint seat according to claim 5, wherein said pivotal axis of said seat includes a twisting gear set.

* * * * *